July 1, 1958

A. R. SKARSTEN 2,841,682

PAINT STRIPPING APPLIANCES

Filed July 16, 1956

A. R. SKARSTEN 2,841,682

PAINT STRIPPING APPLIANCES

Filed July 16, 1956

United States Patent Office 2,841,682
Patented July 1, 1958

2,841,682

PAINT STRIPPING APPLIANCES

Anders Rasmussen Skarsten, Welwyn Garden City, England, assignor to Skarsten Manufacturing Company Limited, Welwyn Garden City, England, a British company Application July 16, 1956, Serial No. 598,166

12 Claims. (Cl. 219—29)

This invention relates to paint-stripping appliances, and has for its object the facilitation of the operations of heating the painted surface to soften the paint thereon and simultaneously scraping or stripping off the softened paint. It is the usual practice to employ a blowlamp or other heater, generally in one hand, while as a separate operation with the other hand a scraping knife or the equivalent is worked over the surface.

According to the present invention, a heater and scraper are combined as a unitary device, the two implements being rigidly connected to a common handle whereby the user can operate with one hand, running the heater over the work and simultaneously using the scraper.

In the preferred form, the heater is readily detachable at will from the handle to enable the scraper to be used alone. The heater and scraper may be situated at opposite ends of the common handle.

One form of paint-stripper in accordance with the invention will now be described by way of example, and with reference to the accompanying drawings in which.

Figure 1:
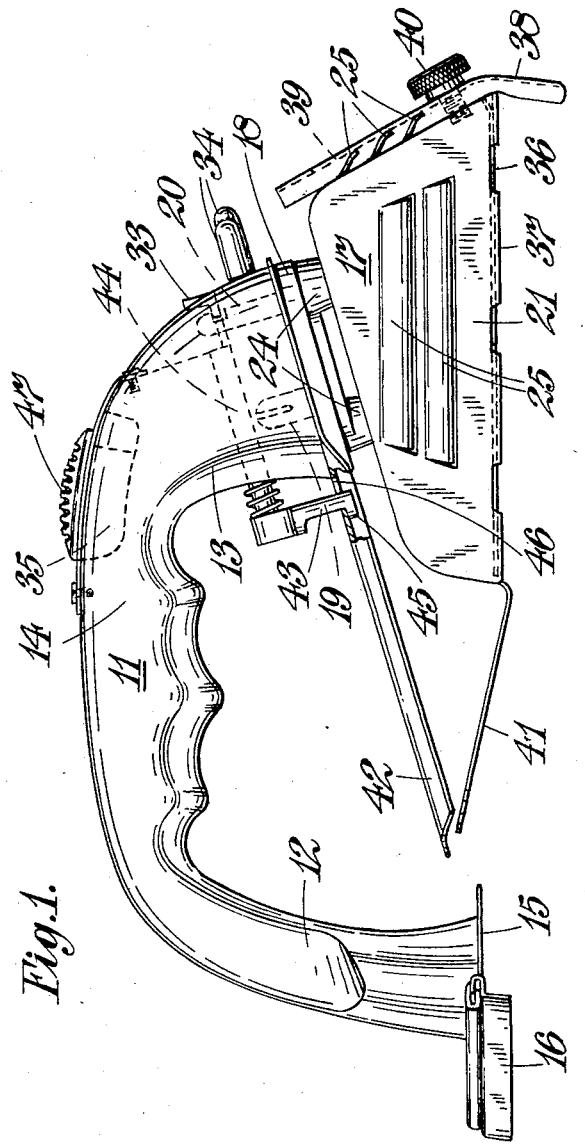
Figure 1 is a view of the paint-stripper in side elevation.
Figure 2:
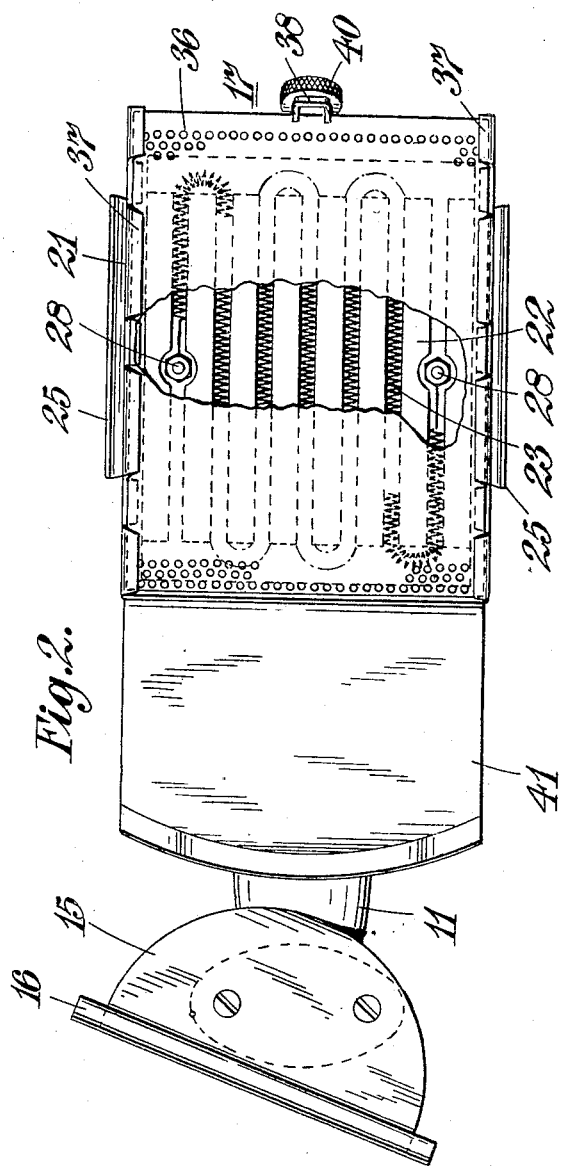
Figure 2 is an underneath plan.
Figure 4:
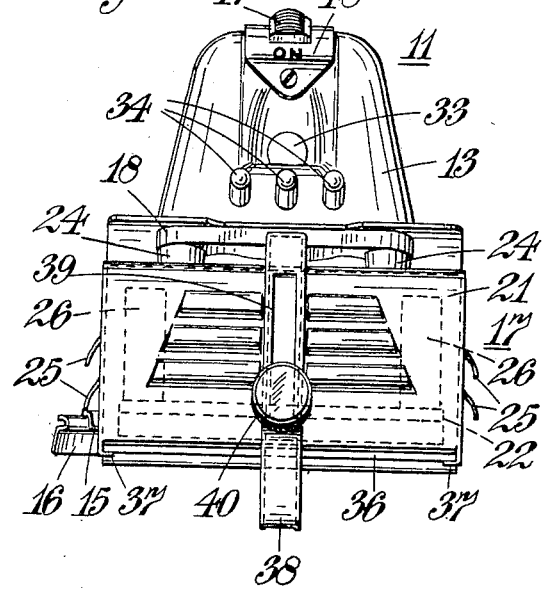
Figure 4 is a rear elevation.
Figure 3:
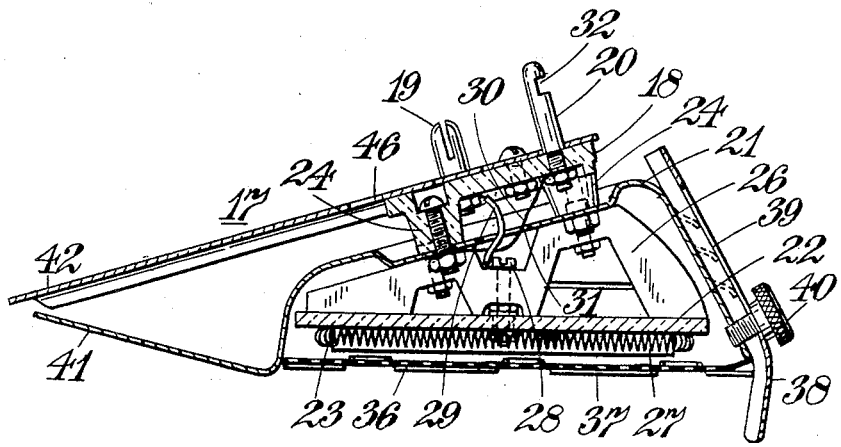
Figure 3 is a sectional side elevation of the heating unit only of the stripper.

The paint-stripper to be described comprises a handle 11 moulded in hard plastic insulating material, shaped rather like the handle of an electric iron, with a limb 12 or 13 at each end joined by a middle or bridge portion 14 intended to be gripped in the hand. On one limb 12 is screwed a semi-circular metal holder plate 15 upon which is fitted a renewable paint-removing scraper blade 16 of the kind known as a Skarsten hook; this blade, which is made of 1% carbon steel hardened and tempered, has a channel-form body to interfit with a complementary channelled edge on the holder plate 15, and a longitudinal sharpened edge on a flange outwardly-bent along one edge or rim of the channel body. The other handle limb 13 carries an electric heating element for softening the paintwork in advance of the scraper blade. The scraper blade 16 is set at an angle of about 65° to the fore-and-aft axis of the tool.

The electric heating element is part of a unit, indicated generally by 17, that is readily detachable from the remainder of the tool. Said unit 17 comprises essentially a heat-resisting insulator 18 carrying three robust plug pins 19, 20 which fit into an electric three-pin socket in the end of the handle limb 13, a housing 21 of metal, for example aluminium alloy or fabricated steel, and a heat-resisting channelled insulating plate 22 of rectangular shape carried by the housing 21 to act as a mount and backing member for the coiled wire heating element 23. The housing 21 is secured to the insulator 18 carrying the plug pins by being bolted to three bosses 24 on said insulator; by this means an air space about ¼ inch across is left between the housing 21 carrying the heating element and the insulator 18 plugged to the tool handle.

The housing 21 is open at its underside, that is the side which faces toward the work and away from the handle, to provide a rectangular aperture into which the channelled insulating plate 22 bearing the heating element 23 is placed. The channelled plate almost fills the housing opening and thus serves to shield the interior and top of the housing from the heat. The housing is deep enough to afford a generous space within it behind said channelled plate, and the walls of the housing are provided with louvres 25 to permit free circulation of cooling air in said space.

Within the housing 21 are secured two tapered bridge-like insulating members 26, to which is bolted the channelled insulating plate 22. The bolts serve as a rapid means of securing the heating element and plate to, and detaching them from, the housing 21. The heating element 23, which is a 400 watt element, follows a sinuous path along parallel channels 27 in the insulating plate 22 that is arranged to give substantially even heating of the work. The element has its ends connected to the two bolts 28 which secure the channelled plate 22 to the insulating members 26, and the electric supply connections are made through two short leads 29 each of which connects one of said bolts to one of the plug pins 19. Each lead 29 passes through a hole 31 in the top of the housing 21. The third or earth plug pin 20 is electrically connected to the housing itself by a wire 30.

As the only connection between the heating unit 17 as a whole and the handle 11 of the tool is by means of the three robust plug pins 19, 20, the unit can be quickly removed from the handle to enable the scraper blade 16 to be used alone. The earth pin 20 is provided with a recess 32 into which there engages automatically a spring-loaded catch 33 when the unit 17 is plugged into the handle limb 13. The catch 33 keeps the heating unit normally locked to the handle, but may be depressed manually to release said unit when it is desired to detach it.

The electric supply input to the tool is by way of a three-pin plug socket (not shown) on to three pins 34 at the back of the handle. A switch 35 for the heating element is provided on the handle, the electric leads to the switch being taken through the interior of the handle which is hollow. The switch mechanism is sunk in the handle and is operated by a sliding knurled thumb-push 47 mounted in an escutcheon plate 48. The positioning of the switch ensures that the switch does not become hot to the touch when the tool is in use, and also places it conveniently for operation by the thumb of the hand holding the tool.

A removable small-mesh perforated cover plate or guard 36, slidable in guide flanges 37, is fitted over the opening of the heating unit housing 21, between the heating element 23 and the work, to protect the heating element during use and ensure that it is not fouled by loose paint strippings. A spacing leg or prop 38 is provided on the housing 21 to contact the work and space the heating element a constant distance away from it. It will be appreciated that the amount of heat required to soften paint for stripping varies according to the type of paintwork, and to allow for this the spacing leg 38 is made adjustable, by means of the slot 39 and screw 40, to vary the distance of the heating element from the work to suit different surfaces. It has been found that a satisfactory distance from the middle of the scraper blade 16 to the centre of the heating element 23 is about six inches.

The housing 21 is extended at its forward edge nearest the work by a baffle 41 which slopes at a slight angle away from the work. A second baffle or guard plate 42 is clamped at its rear end between the insulator 18 and the handle limb 13, being secured to and removable with the former, and it extends forwardly and downwardly until it almost meets the forward end of the baffle 41. The baffle 41 serves as a heating plate to keep the hot soft paint easily removable by the scraping hook 16. The baffle or guard 42 serves as protection for the hand of the operator from the heat produced by the tool. The sliding bolt portion 44 of the aforementioned catch 33 passes through the limb 13, and has at its front end a downwardly depending leg 43 with a shoulder 45 to engage a hole 46 in the guard plate 42 when the heating unit is fitted to the handle, thereby providing a firmer fixing for the heating unit.

A particular advantage of this tool resides in the fact that, as already described, the heating unit can be quickly removed so that the tool can be used without it as a scraper alone. This enables the tool to be employed for fine, smooth finishing, a duty to which it could not otherwise be put, as it needs a scraper held at a flatter angle to the work than it is possible to obtain when the heating unit is in position.

I claim:

1. An electrical paint stripping tool, comprising a handle having a substantially straight central grip portion and two limbs at opposite ends of the central portion which extend substantially perpendicularly away therefrom on the said side thereof, an electrical heating unit, including an electrical heating element, releasably secured to the free end of one handle-limb so that the element extends in a plane substantially parallel to the grip portion of the handle, a scraping blade having a channel-form body and a sharpened scraping edge provided on an outwardly-bent flange along one side of the channel body, and means for securing the scraping blade to the free end of the other handle-limb so that the outwardly-bent flange extends in a direction substantially perpendicular to the direction of the grip portion of the handle, whereby the tool is pulled over the surface from which paint is to be stripped.

2. An electrical paint stripping tool as claimed in claim 1 wherein the means for securing the scraping blade to the handle-limb include a blade-holding-plate secured to the handle-limb and having a marginal edge doubled-back over the body of the plate to define a channel with which the blade-body engages.

3. An electrical paint stripping tool as claimed in claim 2, wherein the blade-holding-plate is secured to the handle-limb so that the length of the scraping blade is inclined with respect to the length of the grip portion of the handle.

4. An electrical paint stripping tool comprising a handle having a substantially straight central grip portion and two limbs at opposite ends of the central portion which extends substantially perpendicularly away therefrom on the same side thereof, an electrical heating unit, including an electrical heating element, releasably secured to the free end of one limb of the handle, a blade-holding-plate secured to the other limb of the handle, said blade-holding-plate having a marginal edge doubled-back over the body of the plate to define the channel therewith and a paint-scraping-blade having a body of complementary channel section to, and which engages with, the channel on the blade-holding-plate and having a sharpened scraping edge on an outwardly-bent flange along one side of the channel body, whereby the tool is pulled over the surface to be scraped.

5. A paint stripping tool as claimed in claim 4, wherein a single spacing arm extends outwardly from the said one limb of the handle at the side thereof remote from the paint-scraping-blade to engage the surface from which paint is to be stripped so as to space the heating element away from that surface.

6. A paint stripping tool as claimed in claim 5, wherein means are provided for adjustably securing the single spacing arm to the said one limb of the handle whereby the spacing of the heating element from the surface to be stripped can be adjusted.

7. A paint stripping tool comprising a handle having a substantially straight central grip portion and two limbs at opposite ends of the central portion which extends substantially perpendicularly away therefrom on the same side thereof, a heating element carried at the free end on one limb of the handle, a scraping blade having a channel-form body and a sharpened scraping edge on an outwardly-bent flange along one edge or rim of the channel body, means for securing the blade to the end of the other limb of the handle so that the blade-flange extends in a direction perpendicular to the plane of the heating element and single spacing arm extends outwardly from the said one limb of the handle at the side thereof remote from the blade to engage the surface from which paint has to be stripped.

8. An electrical paint stripping tool, comprising a handle having a substantially straight central grip portion and two limbs at opposite ends of the central portion which extend substantially perpendicularly away therefrom on the same side thereof, an electrical heating element, means for releasably securing the heating element to the free end of one handle-limb, said means comprising electrically conducting spigots electrically connected to said heating element and engaging in electrically conducting sockets carried by the handle, switch means carried by said handle and positioned within reach of the user's thumb when the hand is holding the grip portion of the handle, means for connecting a source of electric current to the sockets through the switch-means and thereby to the heating element, a blade-holding-plate secured to the free end of the other handle-limb and having a marginal edge doubled-back over the body of the plate to define a channel therewith, and a scraping blade having a channel-form body of complementary section to the holding-plate-channel and engaging therein and having a sharpened scraping edge on an outwardly-bent flange along one side of the channel body.

9. An electrical paint stripping tool as claimed in claim 8, wherein a spring urged locking member is mounted on the handle to engage automatically with a recess in one of the electrical spigots as those spigots are inserted into their sockets.

10. An electrical paint stripping tool, comprising a handle having a substantially straight central grip portion and two limbs at opposite ends of the central portion which extend substantially perpendicularly away therefrom on the same side thereof, an electrical heating element, means for releasably securing the heating element to the free end of one handle-limb, said means comprising electrically conducting spigots electrically connected to said heating element and engaging in electrically conducting sockets carried by the handle, switch-means carried by said handle, means for connecting a source of electric current to the sockets through the switch-means and thereby to the heating element, and a scraping blade carried at the end of the other handle-limb, which scraping blade has a channel-form body and a sharpened scraping edge on an outwardly-bent flange along one side of the channel body.

11. An electrical paint stripping tool, comprising a handle having a substantially straight central grip portion and two limbs at opposite ends of the central portion which extend substantially perpendicularly away therefrom on the same side thereof, an electrical heating element, means for releasably securing the heating element to the free end of one handle-limb, said means comprising electrically conducting spigots electrically connected to said heating element and engaging in electrically conducting sockets carried by the handle, switch-means carried by said handle, means for connecting a source of electric current to the sockets through the switch-means and thereby to the heating element a blade-holding-plate attached to the end of the other handle-limb and having a marginal edge doubled back over the body of the plate to define a channel, and a scraping blade having a channel-form body which engages with the channel on the blade-holding-plate and having a sharpened scraping edge on an outwardly-bent flange along one side of the channel body.

12. An electrical paint stripping tool, comprising a handle having a substantially straight central grip portion and two limbs at opposite ends of the central portion which extend substantially perpendicularly away therefrom on the same side thereof, an electrical heating element, means for releasably securing the heating element to the free end of one handle-limb, said means comprising electrically conducting spigots electrically connected to said heating element and engaging in electrically conducting sockets carried by the handle, a spring urged catch member on the handle to engage automatically in a recess on one of the spigots as the spigots are inserted into the sockets, switch-means carried by said handle, means for connecting a source of electric current to the sockets through the switch-means and thereby to the heating element, a blade-holding-plate attached to the end of the other handle-limb and having a marginal edge doubled back over the body of the plate to define a channel, and a scraping blade having a channel-form body which engages with the channel on the blade-holding-plate and having a sharpened scraping edge on an outwardly-bent flange along one side of the channel body.

References Cited in the file of this patent

UNITED STATES PATENTS

| | | |
|---|---|---|
| 2,223,331 | Roesch et al. | Nov. 26, 1940 |
| 2,246,719 | Burnham | June 24, 1941 |
| 2,308,047 | Blakeslee | Jan. 12, 1943 |
| 2,497,535 | Carlino | Feb. 14, 1950 |
| 2,552,193 | Lennox | May 8, 1951 |
| 2,686,248 | Green | Aug. 10, 1954 |
| 2,765,531 | Cambell et al. | Oct. 9, 1956 |
| 2,797,294 | Cox | June 25, 1957 |

FOREIGN PATENTS

| | | |
|---|---|---|
| 74,125 | Norway | Oct. 18, 1948 |
| 354,315 | Great Britain | Aug. 7, 1931 |